Patented Aug. 27, 1935

2,012,558

UNITED STATES PATENT OFFICE 2,012,558

VAT DYESTUFFS OF THE DIBENZANTHRONE SERIES

Hugo Wolff, Mannheim, and Walter Mieg, Opladen, Germany, assignors to General Aniline Works, Inc., New York, N. Y., a corporation of Delaware No Drawing. Application March 15, 1934, Serial No. 715,774. In Germany March 18, 1933

14 Claims. (Cl. 260—61)

The present invention relates to sulphur containing halogenated dibenzanthrones and isodibenzanthrones and process of producing the same.

We have found that very valuable vat dyestuffs are obtained by reacting at least one of the halogens chlorine and bromine, or agents supplying these halogens, in a halogen sulphonic acid, in particular chlorsulphonic acid, with dibenzanthrone, isodibenzanthrone or their halogen substitution products, in the presence of a considerable amount of sulphur. The amount of sulphur should be at least about 2 per cent, preferably between about 8 and about 12 per cent, of the mixture of dibenzanthrone or the like and halogen sulphonic acid subjected to the reaction. Instead of sulphur, a corresponding amount of substances supplying sulphur, as for example sulphur monochloride, may be employed. Reaction already sets in at ordinary temperature, but it is accelerated by increasing the temperature to between about 40° and about 60° C. Higher temperatures such as 75° to 80° C. may also be employed, but the temperature should not be so high that sulphonation takes place. Halogenation catalysts, such as iodine, may be added to the reaction mixture. Generally speaking, unsubstituted dibenzanthrone or isodibenzanthrone are used as initial materials, but halogenated dibenzanthrones or isodibenzanthrones such as are prepared by halogenation in organic solvents, for example nitrobenzene, or in sulphuric or chlorsulphonic acid, may be used as well and their properties improved. The new dyestuffs contain, in addition to halogen, from about 3 to about 12 per cent of sulphur, in a chemically combined state, depending on the duration of the reaction or the temperature, the sulphur content being the higher, the longer the duration of the reaction and the higher the temperature.

When carrying out the halogenation in chlorsulphonic acid, the latter gives off some chlorine to the products. Especially valuable products are those obtained by means of bromine in chlorsulphonic acid, containing between about 20 and about 24 per cent of bromine and some chlorine, preferably between about 1 and about 3 per cent, and sulphur in the before-mentioned amounts, preferably between about 5 and about 10 per cent. The new dyestuffs have excellent tinctorial and fastness properties, in particular they are insensitive to the temperature employed in dyeing, i. e. they give the same shades whether dyed at higher or lower temperatures, and against drops of water. The dyeings obtainable from these dyestuffs on vegetable fibres have from green-blue to violet-blue, in many cases navy-blue shades.

The following examples will further illustrate the nature of this invention but the invention is not restricted to these examples. The parts are by weight.

Example 1

40 parts of pure dibenzanthrone are dissolved in 400 parts of chlorsulphonic acid at room temperature. As soon as complete dissolution has taken place, 40 parts of sulphur and 20 parts of bromine are added. The solution is heated gradually to 50° C. within from 3 to 5 hours and stirred at the said temperature until bromine is no longer absorbed. After cooling the reaction mixture it is poured onto ice, diluted with water, boiled, filtered and washed with water until neutral. A dark paste is obtained which yields with caustic soda solution and hydrosulphite a reddish blue vat from which vegetable fibres are dyed beautiful navy-blue shades of very good fastness properties. When dried the dyestuff is a dark powder which dissolves in concentrated sulphuric acid giving a reddish blue coloration.

The crude dyestuff is somewhat contaminated with sulphur which may be removed if necessary by the usual methods, as for example by boiling up with carbon disulphide. The dyestuff freed from free sulphur contains, according to analysis, about 22 per cent of bromine, about 3 per cent of chlorine and about 8 per cent of sulphur. The content of the dyestuff of halogen and combined sulphur varies with the reaction conditions which may be varied within very wide limits. Thus instead of raising the said reaction temperature up to 50° C. it may be raised somewhat higher and the duration of the reaction shortened, or lower reaction temperature may be used and the reaction time lengthened, or all the working conditions may be changed among which are included the amount of sulphur and bromine added. In this way navy-blue dyestuffs may be obtained which yield more reddish or more greenish dyeings depending on the working conditions.

Example 2

50 parts of dibenzanthrone are dissolved in 300 parts of chlorsulphonic acid and 30 parts of sulphur and 25 parts of bromine are added thereto. The procedure described in Example 1 is then followed. The resulting dyestuff is a dark powder which dissolves in concentrated sulphuric acid giving a reddish violet coloration. With caustic soda solution and hydrosulphite, a red-violet vat is obtained from which vegetable fibres are dyed fast navy-blue shades. The purified dyestuff contains, according to analysis, about 22 per cent of bromine, about 2 per cent of chlorine and about 7 per cent of sulphur and has the property, remarkable for a navy-blue dyestuff of this class, that it is not sensitive to temperature during dyeing, i. e. the shades of the dyeings obtained at different temperatures, as for example 50° and 70° C., are practically identical.

*Example 3*

25 parts of dibenzanthrone are dissolved in 200 parts of chlorsulphonic acid. 20 parts of sulphur are added and chlorine led in, the temperature being gradually raised to 50° C. during from 3 to 5 hours. When this temperature is reached, chlorine is still led in at from 50° to 52° C. until from 15 to 17 parts of chlorine have been absorbed in all. The reaction mixture is worked up in the usual manner. A dark paste is thus obtained which yields a blue vat from which vegetables fibres are dyed fast navy-blue shades. In the dry state, the dyestuff is a dark powder which dissolves in concentrated sulphuric acid giving a blue coloration. By extraction with carbon disulphide, the powder may be freed from admixed sulphur; it then has, according to analysis, a chlorine content of 13 per cent and a sulphur content of 12 per cent.

If more chlorine than specified be led into the reaction mixture, dyestuffs having still higher contents of chlorine are obtained which yield more greenish dyeings.

A bromination may also be combined with the chlorination, by adding to the reaction mixture before leading in the chlorine a certain amount of bromine (in the case of this example, 4 parts of bromine for example) and then leading in an amount of chlorine which is inferior to that mentioned above by the amount corresponding to the added bromine. A dyestuff is thus obtained which contains chlorine and bromine as well as sulphur.

*Example 4*

50 parts of pure isodibenzanthrone are heated in the manner described in Example 1 with 400 parts of chlorsulphonic acid, 40 parts of sulphur and 25 parts of bromine. A crystalline paste having a bronze lustre is obtained which yields a blue vat from which vegetable fibres are dyed very fast and beautiful violet-blue shades. The dyeings have a fastness to drops of water which is comparatively good for a dyestuff of the isodibenzanthrone series. In the dry state the dyestuff is a powder having a bronze lustre which dissolves in concentrated sulphuric acid giving a green coloration. The dyestuff, when freed from admixed sulphur, contains about 4 percent of sulphur, 22 per cent of bromine and 1 per cent of chlorine according to analysis.

Similar dyestuffs are obtained by causing chlorine or chlorine and bromine to act on isodibenzanthrone.

*Example 5*

25 parts of pure dibenzanthrone are dissolved in 200 parts of chlorsulphonic acid; 20 parts of finely pulverized potassium bromide are introduced at about 15° C., 20 parts of sulphur are added and the whole heated in the manner described in Example 1. A dyestuff is obtained which is very similar in its tinctorial and chemical properties to that described in Example 1.

*Example 6*

20 parts of monobromdibenzanthrone (obtainable by reacting 50 parts of dibenzanthrone in 400 parts of chlorsulphonic acid with 10 parts of bromine after the addition of 0.25 part of sulphur for 6 hours at about 40° C.) are dissolved in 160 parts of chlorsulphonic acid whereupon 20 parts of sulphur and 8 parts of bromine are added and the whole slowly heated to 60° C. and stirred at the said temperature for several hours. The reaction is terminated when on working up and dyeing of several samples a difference in shade can no more be observed. The reaction mixture is then worked up in the usual manner. The resulting dyestuff is practically identical as regards its reactions and fastness properties with the dyestuff obtained according to Example 1.

*Example 7*

200 parts of dibenzanthrone are dissolved, while stirring, in 1600 parts of chlorsulphonic acid at between about 8° and 12° C., whereupon 150 parts of sulphur and 100 parts of bromine are added. The reaction mixture is then heated in the course of between 5 and 6 hours to 50° C. and stirred at the said temperature until all bromine is consumed. The reaction mixture is then worked up as described in Example 1. The product is a dark powder after removing the adherent sulphur and is very similar in its chemical and tinctorial properties to the dyestuffs described in Examples 1 and 2. According to analysis it contains about 20 to 21 per cent of bromine, about 2.5 to 3 per cent of chlorine and about 6 per cent of sulphur.

What we claim is:—

1. A process of producing vat dyestuffs which comprises reacting a compound selected from the group consisting of dibenzanthrone, isodibenzanthrone and their halogen substitution products, in a halogen sulphonic acid with a halogenating agent selected from the group consisting of chlorine, bromine and agents supplying these halogens, in the presence of at least two per cent of sulphur by weight of the mixture of the said compound and halogen sulphonic acid.

2. A process of producing vat dyestuffs which comprises reacting a compound selected from the group consisting of dibenzanthrone, isodibenzanthrone and their halogen substitution products, in chlorsulphonic acid with a halogenating agent selected from the group consisting of chlorine, bromine and agents supplying these halogens, in the presence of at least two per cent of sulphur by weight of the mixture of the said compound and chlorsulphonic acid.

3. A process of producing vat dyestuffs which comprises reacting dibenzanthrone in chlorsulphonic acid with bromine in the presence of at least two per cent by weight of sulphur of the mixture of the said dibenzanthrone and chlorsulphonic acid.

4. A process of producing vat dyestuffs which comprises reacting a compound selected from the group consisting of dibenzanthrone, isodibenzanthrone and their halogen substitution products, in chlorsulphonic acid at between about 40 and about 60° C. with a halogenating agent selected from the group consisting of chlorine, bromine and agents supplying these halogens, and in the presence of at least two per cent of sulphur by weight of the mixture of the said compound and chlorsulphonic acid.

5. A process of producing vat dyestuffs which comprises reacting dibenzanthrone in chlorsulphonic acid at between about 40° and about 60° C. with bromine and in the presence of at least two per cent of sulphur by weight of the mixture of the said dibenzanthrone and chlorsulphonic acid.

6. Vat dyestuffs which are halogen substitution products of a compound selected from the group consisting of dibenzanthrone and isodibenzanthrone, containing at least one of the halogens chlorine and bromine and from about 3 to about 12 per cent of sulphur, dyeing the vegetable fibre from green-blue to violet-blue shades.

7. Vat dyestuffs which are halogen substitution products of a compound selected from the group consisting of dibenzanthrone and isodibenzanthrone, containing at least one of the halogens chlorine and bromine and from about 5 to about 10 per cent of sulphur, dyeing the vegetable fibre from green-blue to violet-blue shades.

8. Vat dyestuffs which are halogen substitution products of a compound selected from the group consisting of dibenzanthrone and isodibenzanthrone, containing chlorine and bromine and from about 3 to about 12 per cent of sulphur, dyeing the vegetable fibre from green-blue to violet-blue shades.

9. Vat dyestuffs which are halogen substitution products of a compound selected from the group consisting of dibenzanthrone and isodibenzanthrone, containing chlorine and bromine and from about 5 to about 10 per cent of sulphur, dyeing vegetable fibre from green-blue to violet-blue shades.

10. Vat dyestuffs which are dibenzanthrones containing from about 20 to about 24 per cent of bromine, chlorine and from about 5 to about 10 per cent of sulphur, dyeing the vegetable fibre navy-blue shades.

11. Vat dyestuffs which are dibenzanthrones containing from about 20 to about 24 per cent of bromine, from about 1 to about 3 per cent of chlorine and from about 5 to about 10 per cent of sulphur, dyeing the vegetable fibre navy-blue shades.

12. Bromo - chlorodibenzanthrone containing about 22 per cent of bromine, about 3 per cent of chlorine and about 8 per cent of sulphur dissolving in concentrated sulphuric acid to give a reddish-blue coloration and dyeing the vegetable fibre navy-blue shades from a reddish-blue vat.

13. Bromo - chlorodibenzanthrone containing about 22 per cent of bromine, about 2 per cent of chlorine and about 7 per cent of sulphur, dissolving in concentrated sulphuric acid to give a reddish violet coloration and dyeing the vegetable fibre navy-blue shades from a red-violet vat.

14. Bromo - chlorodibenzanthrone containing about 20 to 21 per cent of bromine, about 2.5 to 3 per cent of chlorine and about 6 per cent of sulphur, dissolving in concentrated sulphuric acid to give a reddish-violet coloration and dyeing the vegetable fibre navy-blue shades from a red-violet vat.

HUGO WOLFF.
WALTER MIEG.